UNITED STATES PATENT OFFICE.

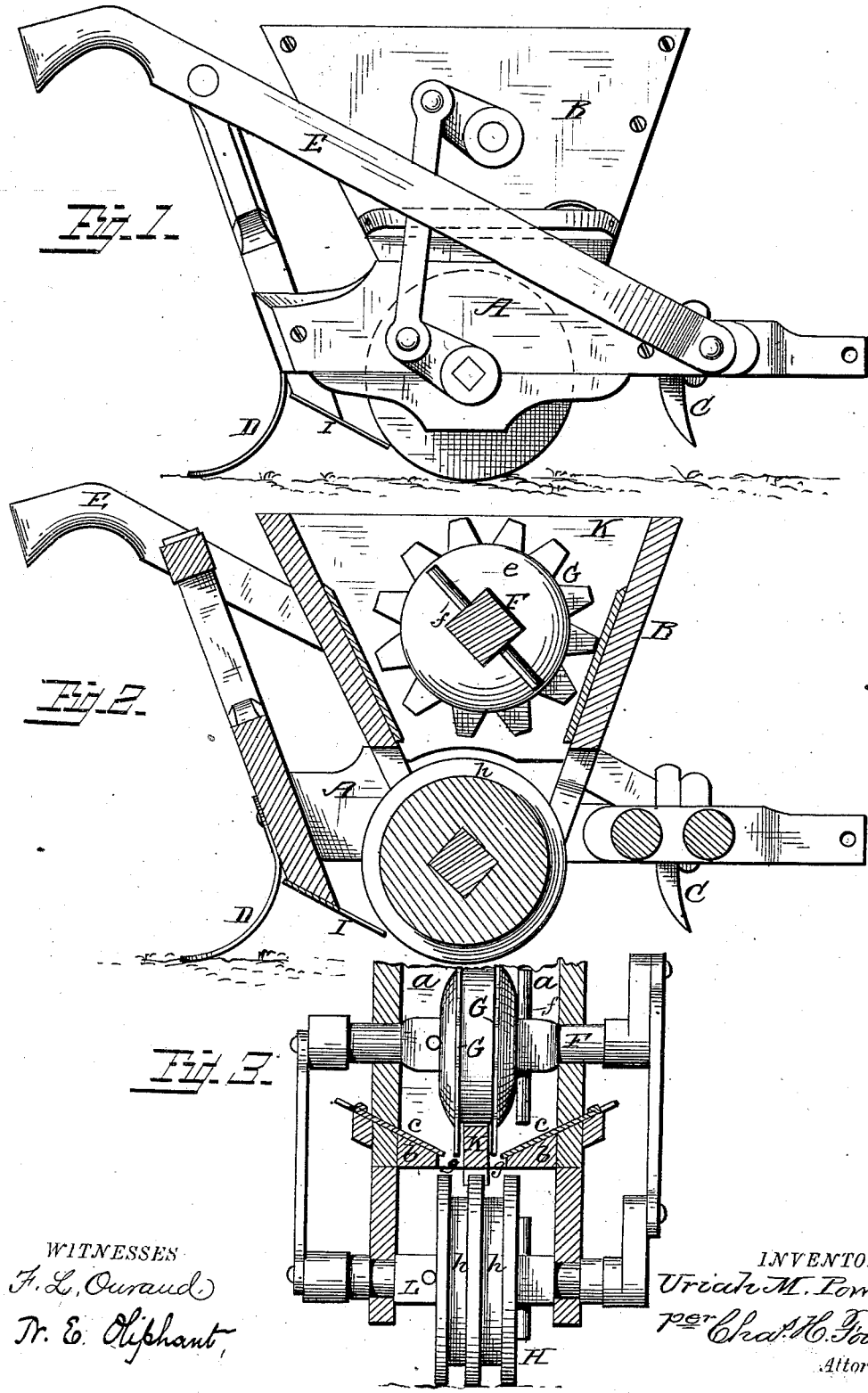

URIAH M. POWELL, OF DAWSON, GEORGIA.

SEEDING-MACHINE.

SPECIFICATION forming part of Letters Patent No. 273,146, dated February 27, 1883.

Application filed September 19, 1882. (No model.)

*To all whom it may concern:*

Be it known that I, URIAH M. POWELL, a citizen of the United States, residing at Dawson, in the county of Terrell and State of Georgia, have invented certain new and useful Improvements in Seeding-Machines; and I do hereby declare that the following is a full, clear, and exact description of the same, reference being had to the annexed drawings, making a part of this specification, and to the letters and figures of reference marked thereon.

Figure 1 of the drawings is a side elevation, Fig. 2 a longitudinal vertical section, and Fig. 3 a cross-section, of my invention.

The present invention has relation to certain new and useful improvements in that class of seeding-machines in which is employed an open-troughed or grooved wheel to receive the seed from the hopper and deposit it upon the ground, and also a scraper in connection therewith for cleaning the wheel. Previous to my invention these troughs or wheels were provided with a single groove only for receiving the seed or fertilizer from the hopper, as the case may be.

The invention consists in the employment, in connection with a double hopper, or one having two separate compartments, of a single wheel having two separate grooves, each of which is located directly under its respective compartment to receive the seed or fertilizer therefrom and distribute it as desired.

The invention further consists in the several details of construction, substantially as shown in the drawings and hereinafter described and claimed.

In the drawings, A represents the frame-work of the machine, having attached thereto the hopper B, furrow-opener C, coverers D, and handles E. The hopper B has two compartments, $a$, formed by a central partition, K, said compartments having sloping bottoms $b$, upon which work slides $c$ for regulating the delivery of the contents.

Journaled in the hopper B is a shaft, F, carrying agitators or cutters G, formed preferably of a sheet-metal plate. These agitators are held up against the central partition of the hopper by means of suitable washers, $e$, said washers being prevented from lateral play by pins $f$, which may also act as agitators at the central part of the compartments $a$, the teeth upon the agitators G being bent out from the central partition to thoroughly agitate the contents of the hopper and carry the same to the openings $g$ therein.

Journaled in the frame-work A, below the hopper B, on the same vertical plane with the shaft F, is a shaft, L, carrying a distributer-wheel H, having thereon two circumferential grooves, $h$ $h$, on a line with the openings $g$ $g$ in the hopper. The wheel H revolves, as the machine is drawn along, by coming in contact with the ground, and the shaft thereof, being connected with the shaft F by means of cranks, arms, and pitmen, belts and pulleys, or other suitable connections, causes the revolution of the agitators, thereby thoroughly agitating and forcing the seed and fertilizer out of the openings $g$ $g$ in the hopper.

Secured upon the frame-work A of the machine, in the rear of the distributer-wheel H, is a scraper, I, for the purpose of removing any seed or fertilizer that may stick in the grooves, and at the same time free the wheel from any accumulation of dirt, which is likely to gather thereon when the ground is moist.

When it is desired to operate my machine the seed is put in one compartment of the hopper and the fertilizer in the other, while the slides are regulated to the amount necessary to be dropped. As the machine is drawn forward the furrow is formed by the furrow-opener, and the seed and fertilizer dropped from the hopper and deposited therein by the action of the distributer-wheel and its connections with the agitators. When the seed and fertilizer have been dropped in the furrow the dirt is thrown over the same by the coverer, while the scraper removes the seed and fertilizer that may adhere to the grooves in the distributer-wheel and all dirt that may accumulate thereon.

While I have described my invention as being preferably used for sowing seed and fertilizer at the same time, it is obvious that either may be sown independent of the other.

Having now described my invention, what I claim as new, and desire to secure by Letters Patent, is—

1. The combination, with the hopper B, having two separate compartments with openings

*g*, and containing suitable agitators, of a single distributing-wheel, H, provided with two circumferential grooves, *h h*, each of which is located directly under the opening of its respective compartment, substantially as and for the purpose set forth.

2. The hopper B, having compartments *a a*, slides *c*, and suitable agitators, in combination with the distributer-wheel H, having the two circumferential grooves *h h* and the scraper I, substantially as and for the purpose specified.

3. In a seeder or fertilizer, the combination, with the grooved distributer-wheel H, of the hopper B, having central partition, K, and the agitators G, held against the sides thereof by the washers *e*, substantially as and for the purpose set forth.

4. The frame A, carrying furrow-opener C, coverer D, scraper I, and hopper B, having double compartments, in combination with the agitators G, working against the central partition thereof, and the double grooved distributing-wheel H, substantially as and for the purpose set forth.

In testimony that I claim the above I have hereunto subscribed my name in the presence of two witnesses.

URIAH M. POWELL.

Witnesses:
 J. C. F. CLARK,
 J. R. MERCER.